US008181184B2

(12) United States Patent
Booton (10) Patent No.: US 8,181,184 B2
(45) Date of Patent: May 15, 2012

(54) SYSTEM AND METHOD FOR SCHEDULING TASKS IN PROCESSING FRAMES (75) Inventor: Richard Booton, Fairport, NY (US)

(73) Assignee: Harris Corporation, Melbourne, FL (US)

(*) Notice: Subject to any disclaimer, the term of this patent is extended or adjusted under 35 U.S.C. 154(b) by 870 days.

(21) Appl. No.: 12/253,441

(22) Filed: Oct. 17, 2008

(65) Prior Publication Data
US 2010/0100883 A1 Apr. 22, 2010

(51) Int. Cl.
G06F 9/46 (2006.01)
G06F 9/50 (2006.01)

(52) U.S. Cl. ......... 718/104; 718/101; 718/102; 718/103

(58) Field of Classification Search .................. 718/101, 718/102, 104, 105
See application file for complete search history.

(56) References Cited

U.S. PATENT DOCUMENTS

| 5,408,663 | A  | * | 4/1995  | Miller ............................ 718/104 |
| 5,535,207 | A  |   | 7/1996  | Dupont |
| 5,724,587 | A  | * | 3/1998  | Carmon et al. ................ 718/104 |
| 6,338,130 | B1 | * | 1/2002  | Sinibaldi et al. ................ 712/35 |
| 6,385,638 | B1 | * | 5/2002  | Baker-Harvey ............... 718/107 |
| 6,577,641 | B1 |   | 6/2003  | Izumi |
| 6,711,607 | B1 | * | 3/2004  | Goyal ............................ 709/203 |
| 6,941,532 | B2 | * | 9/2005  | Haritsa et al. ................. 716/114 |
| 7,006,516 | B2 |   | 2/2006  | Bellier et al. |
| 7,082,111 | B2 |   | 7/2006  | Amouris |
| 7,093,250 | B1 | * | 8/2006  | Rector ........................... 718/100 |
| 7,313,234 | B2 | * | 12/2007 | Takagaki et al. ................ 380/28 |
| 7,516,455 | B2 | * | 4/2009  | Matheson et al. ............. 718/102 |
| 7,688,776 | B2 | * | 3/2010  | Sexton et al. .................. 370/322 |
| 2003/0074175 | A1 | * | 4/2003 | Haritsa et al. ................... 703/19 |
| 2007/0169125 | A1 | * | 7/2007 | Qin ............................... 718/102 |
| 2008/0066072 | A1 | * | 3/2008 | Yurekli et al. ................ 718/104 |
| 2010/0083265 | A1 |   | 4/2010 | Booton |

OTHER PUBLICATIONS

Time division multiple access [online], [retrieved on Jul. 11, 2008]. Retrieved from the Internet <URL: http://en.wikipedia.org/wiki/Time_division_multiple_access>.
Time Division Multiple Access (TDMA), International Engineering Consortium [online], [retrieved on Jul. 11, 2008]. Retrieved from the Internet <URL: http://www.iec.org/online.tutorials/tdma/>.

* cited by examiner

Primary Examiner — Aimee Li
(74) Attorney, Agent, or Firm — Fox Rothschild, LLP; Robert J. Sacco (57) ABSTRACT Methods and systems for implementing methods for allocating available service capacity to a plurality of tasks in a data processing system having a plurality of processing channels is provided, where each processing channel is utilized in accordance with a time division multiplex processing scheme. A method can include receiving in the data processing system the plurality of tasks to be allocated to the available service capacity and determining a task from among an unassigned set of the plurality of tasks having a requirement for available service capacity which is greatest. The method can also include identifying at least one of the plurality of processing channels that has an available service capacity greater than or equal to the requirement and selectively assigning the task to the processing channel having a remaining service capacity which least exceeds the requirement.

20 Claims, 6 Drawing Sheets

SYSTEM AND METHOD FOR SCHEDULING TASKS IN PROCESSING FRAMES

BACKGROUND OF THE INVENTION

1. Statement of the Technical Field

The present invention is directed to the field of processing frames, and more particularly to systems and methods for scheduling tasks in processing frames.

2. Description of the Related Art

Multiplexing of data processing and communications tasks has become increasingly more important as the amount of data being processed and/or transmitted continues to increase. For example, in the case of satellite communications, existing satellites have only a limited amount of transmission resources that need to be multiplexed for a relatively large number of users. Similarly, data processing systems typically have a finite amount of resources that needs to be multiplexed for a relatively large number of users.

Although the amount of system resources can be increased to provide additional processing or transmission capacity needed, this is often impractical or cost prohibitive. For instance, in order to increase satellite transmission capacity, the satellite hardware typically must be upgraded or replaced. This generally requires that the satellite be captured in orbit and/or returned to Earth safely, followed by reconfiguration of the satellite prior to reinsertion into orbit. Alternatively, a new satellite can be inserted into orbit to provide the additional capacity. In either approach, new satellite component costs and spaceflight costs are typically high. Similarly, in the case of data processing resources, the additional costs to provide increased processing power (hardware, software, operation, and maintenance costs) are generally high. As a result of such costs, conventional systems typically utilize scheduling techniques to multiplex the user tasks using the limited resources available.

Conventional scheduling techniques generally enable scheduling of multiple user tasks. For example, in the case of satellite communications, only a limited number of communications channels are generally available. To allow multiple users to access these channels, the signals exchanged between the satellite and a receiving station transmitted make use of time division multiple access (TDMA) methods. That is, for each satellite transmission channel, the use of the channel is multiplexed over periods of time (frames) to allow multiple users access to the same channel by evaluating the current time slot arrangement of the satellite channels and allocating to a user the first available timeslot(s) in a channel. Similarly, processing capacity is typically allocated to user tasks by determining the first available processing time slot in the channels.

SUMMARY OF THE INVENTION

The invention concerns a system and method for scheduling tasks in processing frames. In a first embodiment of the present invention, a method for allocating available service capacity to a plurality of tasks in a data processing system having a plurality of processing channels is provided. In the method, each processing channel is utilized in accordance with a time division multiplex processing scheme. The method includes receiving in the data processing system the plurality of tasks to be allocated to the available service capacity and determining a task from among an unassigned set of the plurality of tasks having a requirement for available service capacity which is greatest. The method also includes identifying at least one of the plurality of processing channels that has an available service capacity greater than or equal to the requirement and selectively assigning the task to the processing channel having a remaining service capacity which least exceeds the requirement.

In a second embodiment of the present invention, a system for processing data is provided. The system includes a data processing system having a plurality of processing channels, each of the processing channels utilized in accordance with a time division multiplexing scheme. The system also includes a storage element for receiving a plurality of tasks to be allocated to an available service capacity of the data processing system, and a processing element for allocating the available service capacity of the data processing system to the plurality of tasks. The allocating by the processing element includes determining a task from among an unassigned set of the plurality of tasks received in the storage element having a requirement for available service capacity which is greatest, identifying at least one of the plurality of processing channels that has an available service capacity greater than or equal to the requirement, and selectively assigning the task to the processing channel having a remaining service capacity which least exceeds the requirement.

In a third embodiment of the present invention, a computer readable storage medium is provided. In the computer readable stored medium, a computer program is stored for allocating available transmission capacity to a plurality of data transmission tasks in a time-division multiplex communications system (TDM system) having a plurality of transmission channels utilized in accordance with a time division multiplex processing scheme. The computer program includes a plurality of code sections executable by a computer. The computer program includes code sections for receiving a plurality of data transmission tasks to be allocated to the available transmission capacity and determining a task from among an unassigned set of the plurality of data transmission tasks having a requirement for available transmission capacity which is greatest. The computer program further includes code sections for identifying at least one of the plurality of transmission channels that has an available transmission capacity greater than or equal to the requirement and selectively assigning the task to the transmission channel having a remaining transmission capacity which least exceeds the requirement.

DETAILED DESCRIPTION OF THE PREFERRED EMBODIMENTS

Figure 1:
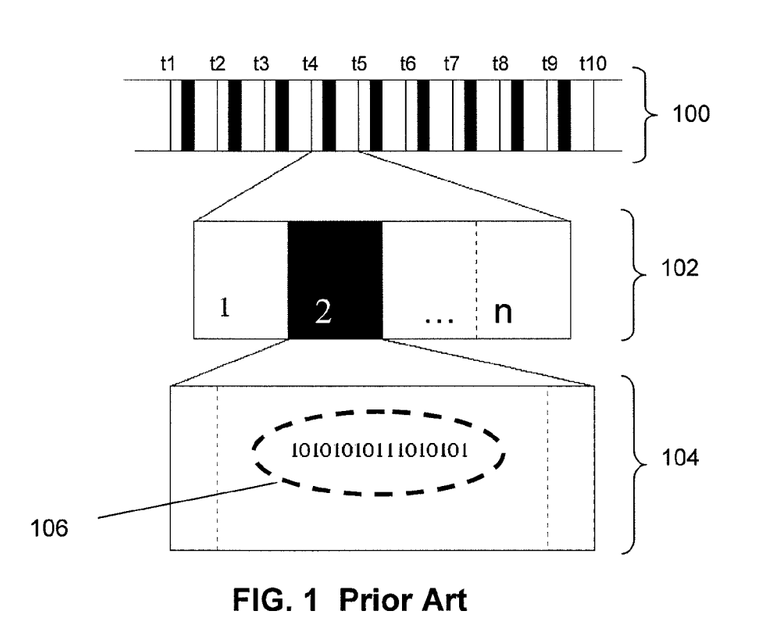
FIG. 1 shows a data stream and components therein that is useful for describing the various embodiments of the present invention.

Embodiments of the present invention provide systems and methods for scheduling tasks using a limited set of processing resources. As previously described, when only limited data transmission or data processing resources are available, user tasks are multiplexed over time. For example, in the case of time-division multiple access (TDMA) communications, data transmission tasks are typically assigned to one of a limited number of transmission channels. As illustrated in FIG. 1, each of the transmission channels 100 can be multiplexed for use by multiple users by dividing utilization of each channel 100 into multiple frames 102, where each frame 102 defines a time interval ( . . . , t1, t2, . . . , t10, . . . ) of use of the channels 100. Each of the frames 102 is then typically divided into multiple slots 104 allocated for user tasks. Each slot 104 can then be used to transmit data 106 or perform some other task defined by the user. In a similar fashion, data processing systems are multiplexed to allow use of a limited number of processing channels by a plurality of users.

Figure 2:
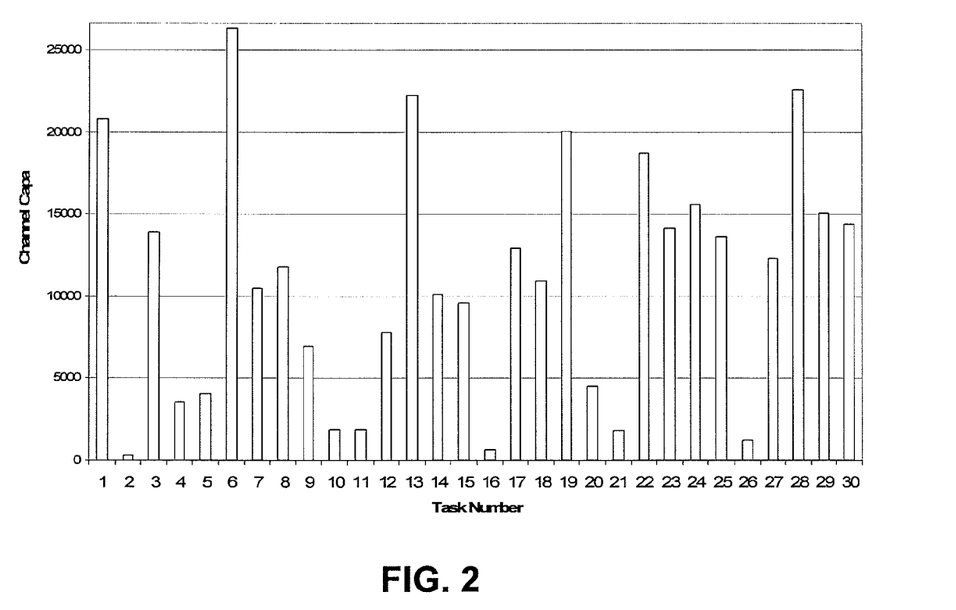
FIG. 2 shows an exemplary set of task requirements that is useful for describing the various embodiments of the present invention.

Although FIG. 1 illustratively shows that the various frames in a channel are divided evenly into equally sized slots, this is typically not the case in data transmission or processing systems. That is, each user task typically has varying requirements, requiring that the total capacity of the frame (i.e., the sum of the capacity of each channel available during a frame) be divided according to processing requirements for each the tasks being specified for the frame. An exemplary set of tasks to be performed using multiple channels during a frame, and their associated processing requirements, are illustrated in FIG. 2.

Figure 3:
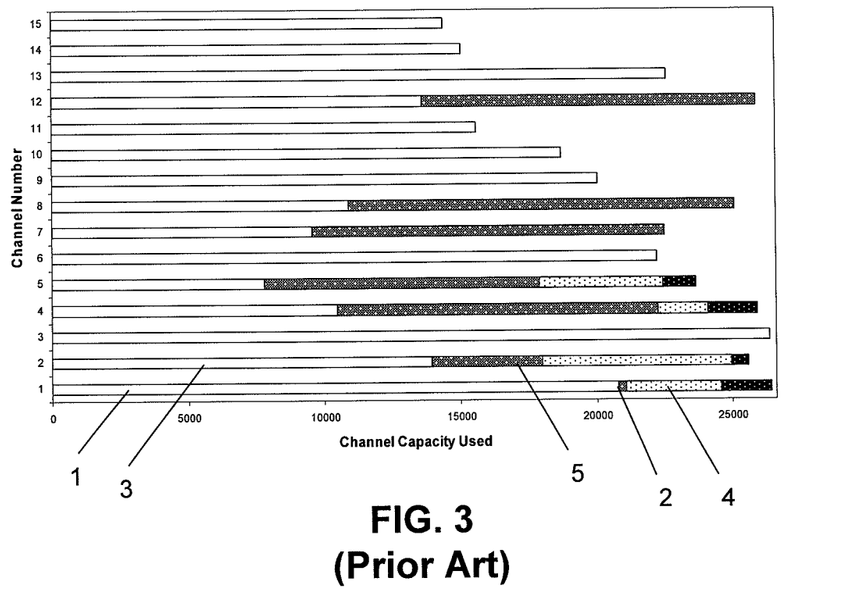
FIG. 3 shows channel assignments for the tasks shown in FIG. 2 based on a FIFO task assignment scheme.

As previously described, a typical scheme for assigning tasks to the various channels is essentially a "first-in, first-out" (FIFO) basis. Such an approach is illustrated in FIG. 3 for the tasks in FIG. 2. In the FIFO approach, the tasks generally assigned a channel in the same order they are received. For example, in the case of the tasks in FIG. 2, task 1 is assigned to channel 1. Task 2 is also assigned to channel 1, since channel 1 still has sufficient remaining capacity. Task 3 is assigned to channel 2 since sufficient capacity is no longer available in channel 1 after assigning the tasks 1 and 2. Task 4 is also assigned to channel 1, since it still has sufficient remaining capacity. Task 5 is assigned to channel 2 since again sufficient capacity is no longer available in channel 1 after assigning the tasks 1, 2, and 4. The tasks in FIG. 2 can then be continued to be assigned to the various channels in this fashion and result in the use of fifteen channels illustrated in FIG. 3.

As a result of the particular allocation scheme being used, the process of assigning tasks to channels typically results in some amount of total frame utilization. The term "total frame utilization", as used herein, refers to the average amount of channel capacity for all channels during a frame having at least one assigned task. In other words, if tasks are assigned to only five of ten channels available during a frame, the utilization for the frame is measured only with respect to the average capacity used and available in the five frames.

The actual amount of total frame utilization can vary according to the number and size of the channels and services. For illustrative purposes, the amounts of total frame utilization described herein are based on the following assumptions: (1) the number of tasks is approximately 2× the number of channels, (2) the size of channels is fixed and constant, and (3) the task are assumed to be of varying sizes, where the sizes are distributed according a normal distribution having a mean task size approximately equal to one half the channel size. For exemplary purposes, 15 channels are assumed, as shown in FIG. 3.

The FIFO allocation scheme, as illustrated in FIG. 3, results in an average total frame utilization of approximately 87%. In the typical FIFO scheme, although approximately 13% of the frame capacity is still available, total frame utilization generally cannot be significantly increased. This is because use of a FIFO schemes normally result in the channels individually having insufficient remaining capacity for assignment of another task. Accordingly, only smaller tasks or divided or fragmented tasks can be added the frame, thus the effective capacity of the frame for handling larger tasks is effectively reduced.

The inventor has discovered that improved utilization of limited channels during a frame can be achieved by imposing at least one optimization condition during assignment of tasks to the channels available during a frame. In particular, total frame utilization can be improved by imposing a condition during the assignment process. The condition being that a user task can only be assigned to a channel during a frame if the particular allocation maximizes the total frame utilization. In other words, a task is assigned to a particular channel based on a comparison of the processing requirements for the task being added and the remaining capacity in the various channels. The particular channel is then selected by selecting the channel in which (a) the task can be performed and (b) uses up as much of the remaining capacity of the channel as possible as compared to assigning the task to another channel. The present inventor has discovered that such an assignment scheme can increase the average total utilization for a conventional TDMA frame as compared to a FIFO assignment scheme.

Figure 4:
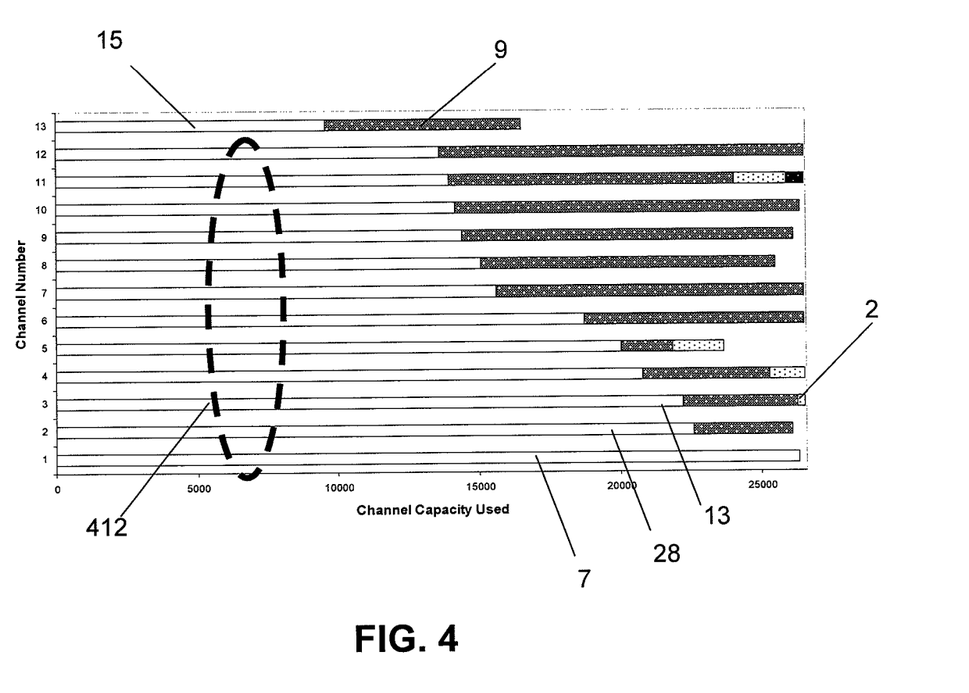
FIG. 4 shows channel assignments for the tasks shown in FIG. 2 based on a task assignment scheme in accordance with an embodiment of the present invention.
Figure 5:
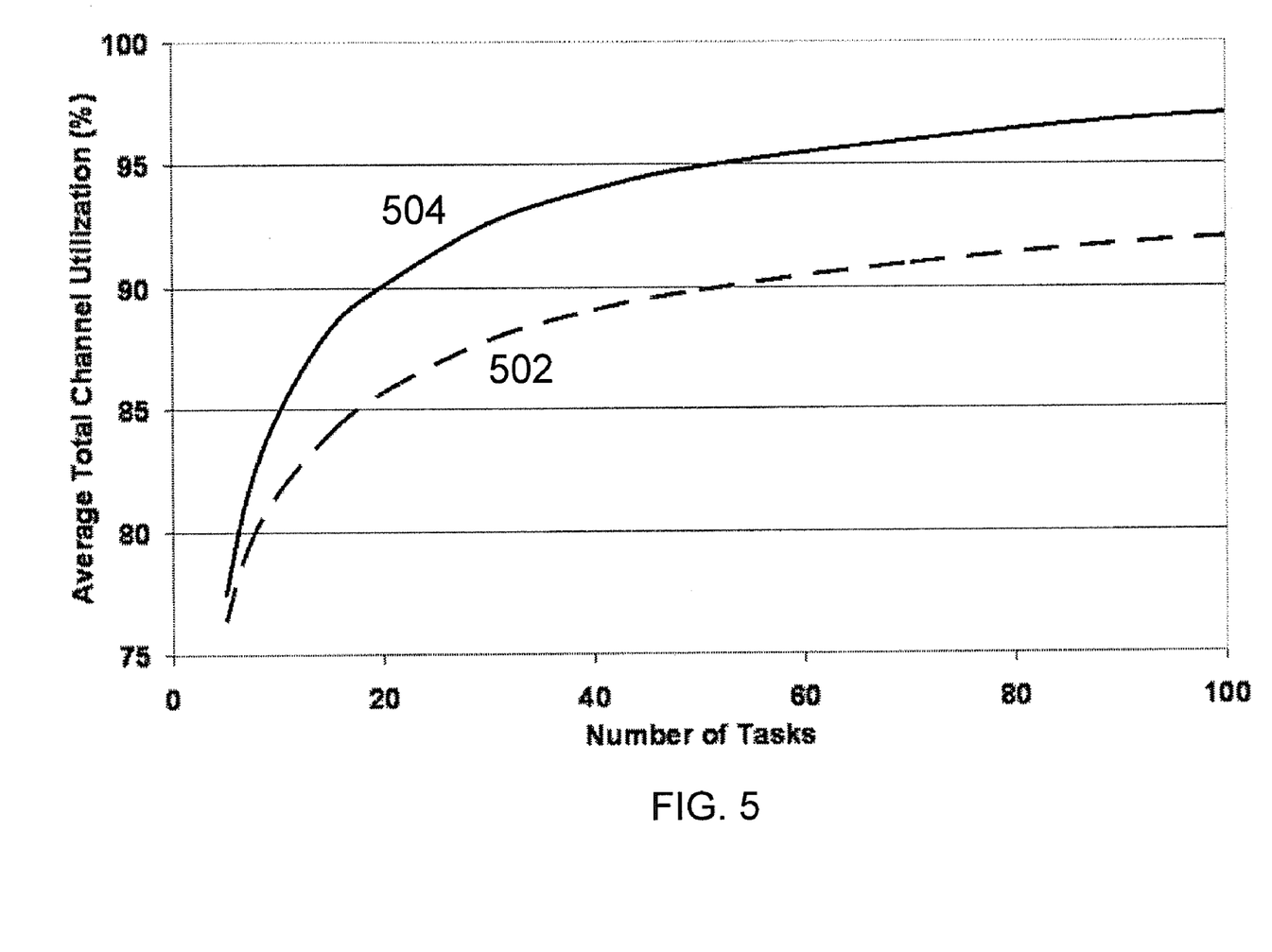
FIG. 5 is a graph of the average total channel utilization of a system employing the present invention.

For example, for the 15 channel previously discussed FIG. 3, the resulting average total frame utilization for the FIFO scheme was approximately 87%. However, when using an assignment scheme according to the various embodiments of the present invention, the tasks in FIG. 2 can be assigned as shown in FIG. 4, resulting in an increased total frame utilization of approximately 93%. Additionally, the effective capacity of the frame is also increased. As shown in FIG. 4, the same number of tasks requires only thirteen of the fifteen channels required in FIG. 3. Therefore, two channels now remain free for allocating system resources for additional (and larger) user tasks, thus increasing the effective capacity of the channel by at least 15% during a frame for the exemplary embodiment in FIG. 4. However, as the number of channels and tasks increases, this number can also be increased. For example, FIG. 5 illustrates how average total utilization varies of FIFO assignment schemes and for assignment schemes in accordance with an embodiment of the present invention. As shown in FIG. 5, curve 502 shows the results of FIFO allocation and curve 504 shows the results of allocation according to an embodiment of the present invention. As shown in FIG. 5, regardless of the number of tasks, the FIFO scheme is consistently inferior. The flattening of curves 502 and 504 is the result of the increased number of channels and the normal distribution of task sizes. That is, as the number of channels increases and the distribution of tasks increases, a larger number of smaller sized tasks will be available to fill the channels. However, as shown in FIG. 5, assignment schemes in accordance with the various embodiments of the present invention will still result in an increased utilization of the channels and, as shown in FIG. 4, an increased amount of channel space for larger tasks without the need for using additional channels.

Figure 6:
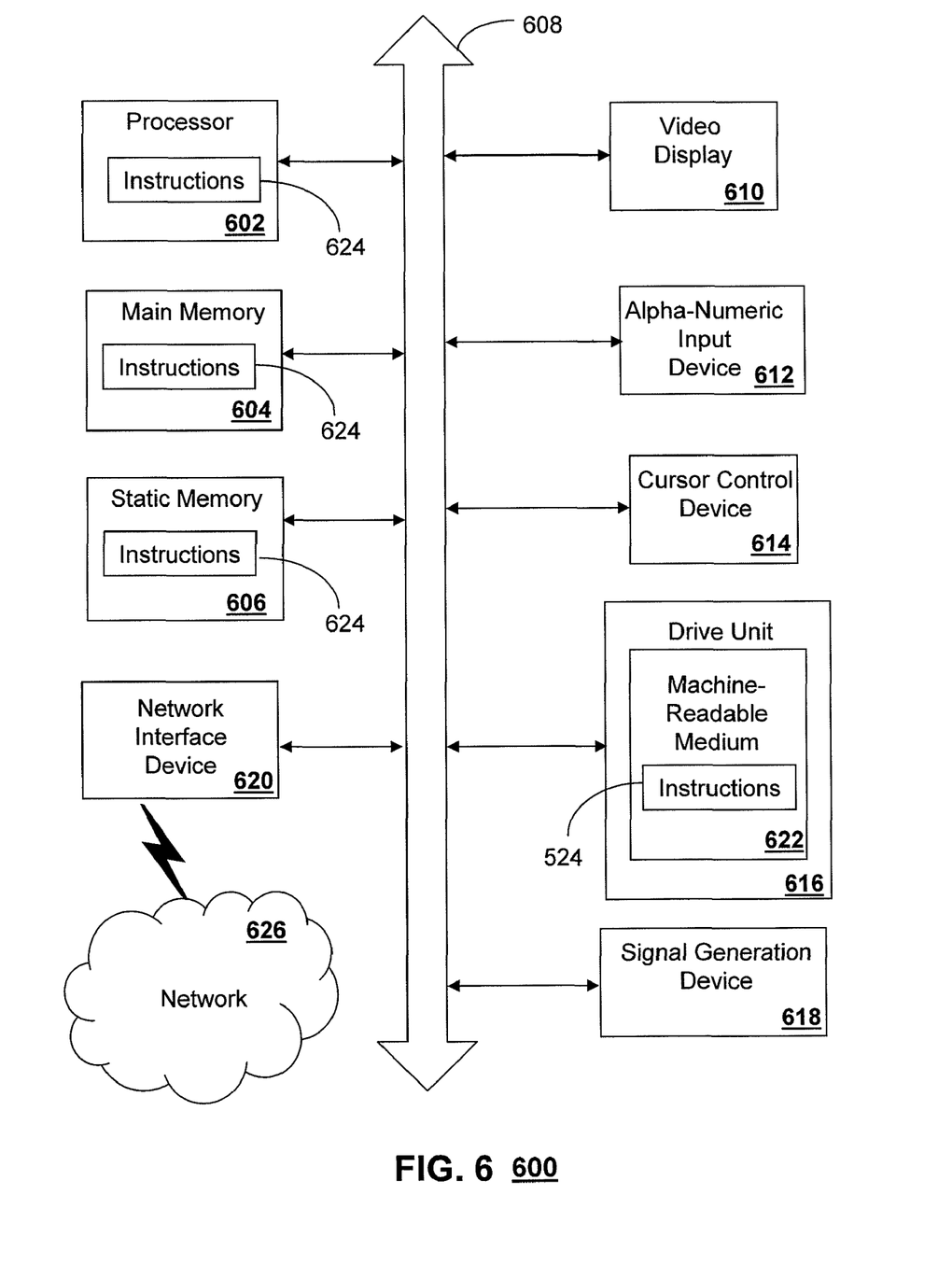
FIG. 6 is a schematic view of a computer system within which a set of instructions operate according to an embodiment of the invention.

The various embodiments of the present invention are specifically embodied as a methods, a data processing system, and a computer program product for allocating tasks or time slots when multiplexing user tasks over a limited number of channels. Accordingly, the present invention can take the form as an entirely hardware embodiment, an entirely software embodiment, or any combination thereof. However, the invention is not limited in this regard and can be implemented in many other forms not described herein. For example, FIG. 6 is a schematic diagram of an embodiment of a computer system 600 for executing a set of instructions that, when executed, causes the computer system 600 to perform one or more of the methodologies and procedures described herein. In some embodiments, the computer system 600 operates as a standalone device. In other embodiments, the computer system 600 is connected (e.g., using a network) to other computing devices. In a networked deployment, the computer system 600 operates in the capacity of a server or a client developer machine in server-client developer network environment, or as a peer machine in a peer-to-peer (or distributed) network environment.

In the some embodiments, the computer system 600 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 600 includes a processor 602 (such as a central processing unit (CPU), a graphics processing unit (GPU, or both), a main memory 604 and a static memory 606, which communicate with each other via a bus 608. The computer system 600 further includes a display unit 610, such as a video display (e.g., a liquid crystal display or LCD), a flat panel, a solid state display, or a cathode ray tube (CRT)). The computer system also includes an input device 612 (e.g., a keyboard), a cursor control device 614 (e.g., a mouse), a disk drive unit 616, a signal generation device 618 (e.g., a speaker or remote control) and a network interface device 620.

The disk drive unit 616 includes a computer-readable storage medium 622 on which is stored one or more sets of instructions 624 (e.g., software code) configured to implement one or more of the methodologies, procedures, or functions described herein. The instructions 624 reside, completely or at least partially, within the main memory 604, the static memory 606, and/or within the processor 602 during execution thereof by the computer system 600. The main memory 604 and the processor 602 also can constitute machine-readable media.

Those skilled in the art will appreciate that the computer system architecture illustrated in FIG. 6 is one possible example of a computer system. However, the invention is not limited in this regard and any other suitable computer system architecture can also be used without limitation.

For example, dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described below can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

Therefore, in some embodiments of the present invention, the present invention is embodied as a computer-readable storage medium containing instructions 624 or that receives and executes instructions 624 from a propagated signal so that a device connected to a network environment 626 sends or receive voice and/or video data and that communicate over the network 626 using the instructions 624. The instructions 624 are further transmitted or received over a network 626 via the network interface device 620.

While the computer-readable storage medium 622 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Figure 7:
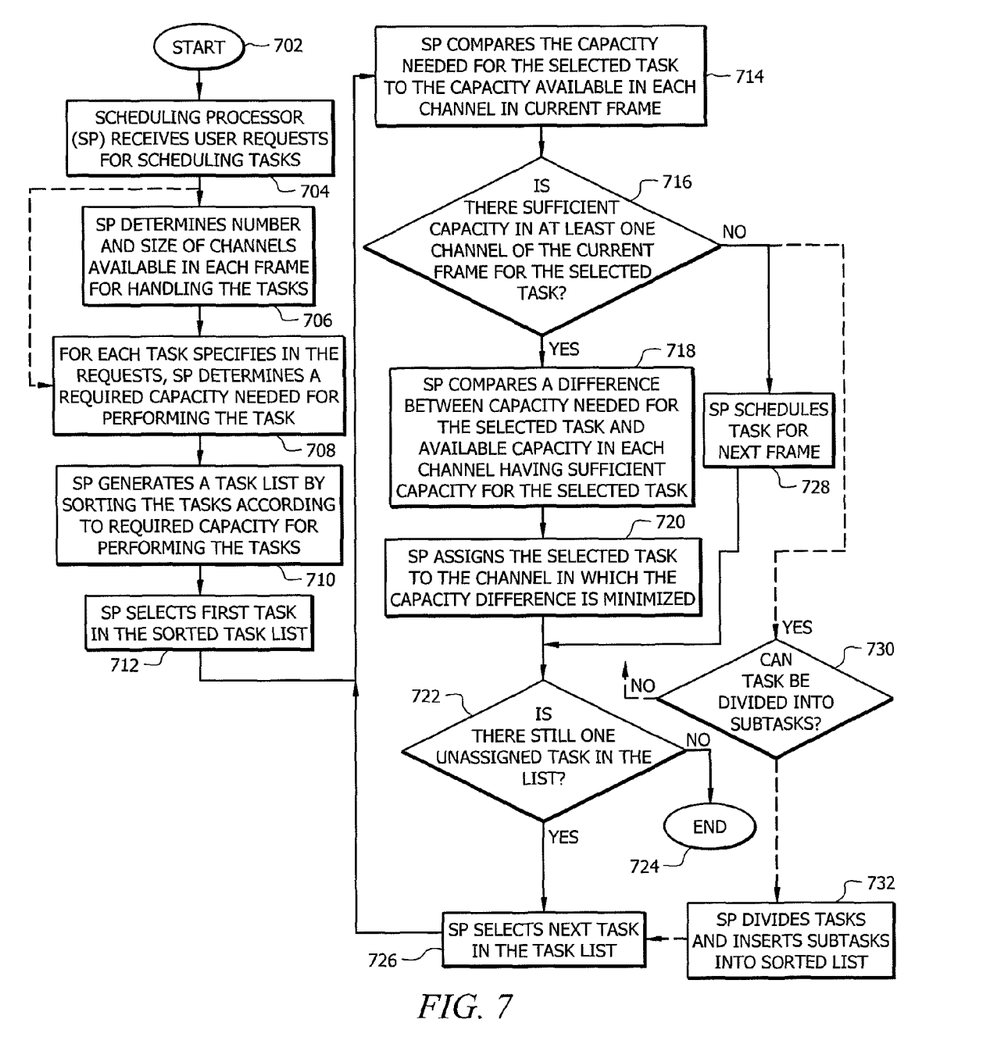
FIG. 7 is a flowchart of steps in an exemplary method for scheduling tasks according to an embodiment of the present invention.
Figure 8:
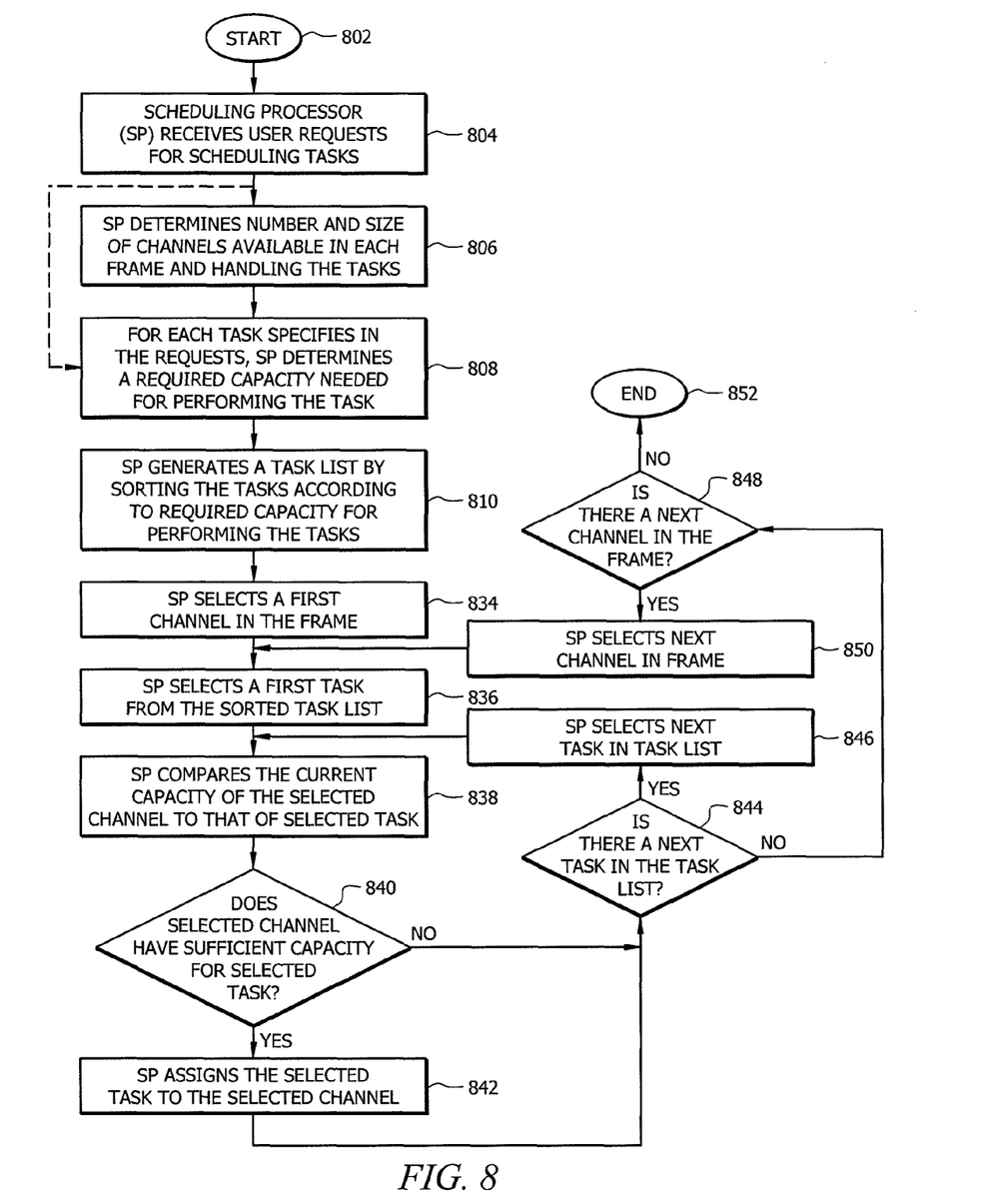
FIG. 8 is a flowchart of steps in another exemplary method for scheduling tasks according to an embodiment of the present invention.

The present invention will now be described in greater detail in relation to the flowcharts in FIGS. 7 and 8, illustrating steps in an exemplary methods 700 and 800 for allocating time slots or scheduling tasks for multiple channels in frames based according to the various embodiments of the present invention. It should be appreciated, however, that the exemplary processes disclosed in FIGS. 7 and 8 are provided for purposes of illustration only and that the present invention is not limited in this regard.

As shown in FIG. 7, the method 700 starts with step 702 and continues on to step 704. In step 704, a scheduling processor (SP) receives user requests for scheduling tasks. As previously described, user tasks can be data processing or transmission tasks, depending on the system. For example, in a data processing system, tasks can include user tasks to access or retrieve data, perform some task using data, or any combination thereof. Accordingly, requests can be received as a message or other instruction from a user to perform one or more data processing tasks. In a transmission system, tasks can include tasks for unidirectional or bidirectional transmission of voice, video, data, or any combination thereof. Thus, transmission requests can comprise requests to initiate or establish a communications link to simply transmit a particular set of information.

Once the user requests have been received in step 704, the SP can determine the number of channels in the current frame and capacity of each channel in the frame in step 706. As used herein, "channels" refer to either processing channels or transmission channels. A processing channel can include a particular set of resources in a system for completing user tasks. The processing channels can include any number and type of hardware resources, software resources, or any combination thereof. Furthermore, such resources can be localized or distributed over a data network. Transmission channels can include not only a transmission device, such as a receiver, a transmitter, or a transceiver, for exchanging signals using a particular set of communications protocols, but can also include any other associated hardware or software resources for operating or communicating with the transmission device. In some embodiments, the number of channels and the capacity of each channel in a frame may already be pre-determined, specified by a system administrator, or can vary dynamically based on one or more conditions.

Alternatively, or in combination with step 706, the SP analyzes each user request and determines the channel capacity required for each of the tasks specified in the user requests. That is, the SP determines the portion of a channel in the frame that will be required for performing the task. This amount varies according to the task. For example, in the case of a communications task, the capacity required can vary according to information being communicated (voice, video, data, etc., . . . ) and the communications mode (analog or digital signals, communications protocols, error checking schemes, etc., . . . ) being used for the communications task. In the case of a processing task, the capacity can vary depending on the amount of processing, memory, or other computing resources needed to complete the processing task.

As previously described, utilization of the frame can be improved when task assignment is based on an assignment algorithm which only permits making assignments that will increase the utilization of the frame. In practical terms, each assignment, i.e., the selection of a task and channel combination, is made by determining the combination that increases utilization as much as possible. In some embodiments, this assignment process can be streamlined by pre-processing the tasks to reduce the amount of searching needed for finding a task for a channel. In particular, as shown in step 710, the tasks are first sorted according to processing requirements. In some embodiments of the present invention, the tasks can be sorted according to decreasing processing requirements. In such embodiments, each task is sequentially selected, starting with the largest tasks, from the list generated in step 710. The remaining capacity in the channel is then first compared to the task requiring the largest capacity. Therefore, a possible best match between required and available capacity can be found without the concern that a previous assignment of smaller tasks (which are easier to place) will prevent a channel from first being used to provide the needed capacity for larger tasks.

For example, as shown in FIG. 4, task 1 is not automatically assigned to channel 1 by the SP, as in the FIFO scheme. Rather, the first task assigned by the SP is the largest task, task 7, and is assigned to channel 1 (or other empty channel, assuming no other tasks have been assigned). The second task then assigned is the next largest task, task 28, and is assigned to channel 2 since sufficient capacity is no longer available in channel 1 after assigning task 7 to channel 1. The third task assigned is the second next largest task, task 13, and is assigned to channel 7 since sufficient capacity is no longer available in channels 1 or 2 after assigning task 7 to channel 1 and task 28 to channel 2. The tasks in FIG. 2 can then be continued to be assigned in this manner and result in the use of the channels illustrated in FIG. 4.

Such an approach increases the utilization of the frame by ensuring that the remaining space in the channels is first assigned to largest possible tasks, increasing total use of the channel. For example, consider two tasks, A and B, having required channel capacities 20 and 25, respectively, and channels X and Y have available capacities 25 and 70, respectively. In a FIFO assignment of A to X and B to Y, the individual utilization of channels X and Y is 80% and 83.3%, respectively. Therefore, the average or total utilization for both channels is 81.7%. However, in the various embodiments of the present invention, the one of A and B having a larger processing requirements (B) is assigned first and assigned to the one of X and Y having a smallest and sufficient remaining or available capacity (as compared to the processing requirements for task B). In the case of tasks A and B, this results in an assignment of Y and X, respectively. Accordingly, the individual utilization of channels X and Y now becomes 100% and 76.7%, respectively. However, the average or total utilization increases to 83.3% due to the increased utilization of channel X, in spite of the lower utilization of channel Y, increasing the overall total utilization. As the number of channels and tasks is further increased, the difference in utilization will become further pronounced, as illustrated by the difference in utilization for the assignments in FIG. 3 versus FIG. 4 (87% vs. 93%, respectively, as previously described).

The reason for the increase in utilization is that by assigning a larger task first, more channel capacity in each channel is available when a larger task is being assigned. In contrast, when FIFO algorithms assign one or more smaller tasks first, thus decreasing the remaining capacity of channel and effectively reducing the number of channels available for assigning larger tasks. Accordingly, as the number of available channels is reduced, the likelihood of finding a channel with remaining capacity closely matching the needed capacity for a task is also reduced. Therefore, in FIFO algorithms, this typically results in channels having significant portions of capacity going unused, as the larger tasks need to be assigned to a different or even an additional channel.

In the various embodiments of the present invention, not only is utilization increased, but effective capacity is increased. As previously described in the example above, a larger amount of channel Y capacity is now available after allocating of channels X and Y to tasks A and B. The remaining (and now larger) capacity of channel Y can be used to schedule a larger number of smaller additional tasks than previously possible using the FIFO scheme. This is further illustrated by FIGS. 3 and 4, showing that the present invention allows the number of channels needed to perform the same tasks in FIG. 2 can be reduced from 15 to 13.

The reason for this increase in capacity is also due to the availability of a larger number of channels available for assigning larger tasks. As this number increases, the likelihood of combining two or more larger tasks into a single channel is also increased. However, even though the larger tasks utilize a greater portion of the used channels, by the time the smaller tasks are being assigned, the remaining capacity of these channels can still be sufficiently assigning other smaller tasks, as described above. Therefore, the likelihood of requiring an additional channel when assigning a smaller channel is reduced and fewer channels can be required for the same number and size of tasks.

Referring back to FIG. 7, once the tasks are sorted in step 710, the SP selects the largest task from the sorted list in step 712. Afterwards, in step 714, the SP compares the processing requirements for the selected task to the remaining or available capacity in each of the channels. If the SP determines in step 716 that at least one channel has sufficient capacity for the selected task, the SP compares the difference between the processing requirements for the selected task and the identified channels in step 718. Based on this comparison, in step 720, the task is assigned to the channel associated with a minimum difference in required versus available capacity as compared to other identified channels.

The increased resulting utilization and effective capacity from assigning tasks based on the sorting of the tasks in step 710 and the comparison in step 718 is illustrated in FIG. 4. However, as previously described, tasks are not simply automatically assigned to channels in order. Rather, prior to each assignment, the SP first considers whether the task can be used to fill remaining capacity in a channel or if another channel is needed. In FIG. 4, the tasks 412 are assigned to channels 1-12, since none of these can be combined in a single channel. However, if the SP determines that a next task can be used to fill a channel already in use, SP then determines which channel the task best fits in. In FIG. 4, this is illustrated by the assignment of task 2. Although task 2 could have been assigned to almost any channel in the frame, due to its small size, channel 7 is selected because the utilization of the channels is maximized by this addition. That is, since the addition of task 2 to channel 7 results in a highest percentage of used capacity for channel 7 as opposed to other candidate channels, the total utilization, dependent on an average of such percentages, is increased. Furthermore, by placing task 2 in channel 7, as opposed to, for example, channel 13, the remaining capacity of channel 13 is used more efficiently by maximizing the amount of remaining capacity in channel 13.

In some cases, it can be necessary to add additional channels. For example, in FIG. 4, tasks 15 and 9 are assigned to channel 13, as insufficient capacity was available in channels 1-12 by the time these tasks were reached in the sorted task list. However, even though channel 13 is needed, because the method attempts first to fill as much of channels 1-12 with smaller tasks prior to filling channel 13, the amount of remaining capacity is increased in channel 13 and is effectively reserved for larger tasks.

In the various embodiments of the present invention, tasks are assigned to channels by allocating a portion of the capacity of a channel in a frame for a task. Accordingly, one or more other tasks can be assigned to the same channel in the frame. After the selected task is assigned to a channel in step 720, the SP determines whether any other tasks still remain in the sorted list in step 722. If not, the method 700 ends in step 724. If at least one other task is found in step 722, the SP selects the next task in the list in step 726 and repeats method 700 for other tasks in the list starting with step 714.

If the SP cannot identify at least one channel in the current frame having sufficient capacity for the selected task in step 216, the method continues to step 728, where the SP can schedule the task for the next frame. In some embodiments, rather than scheduling the task for the next frame, the SP can instead determine if the selected task can be divided into subtasks in step 730. If not, the method 700 proceeds to step 728. If the task can be divided, in step 732 the subtasks are created and inserted into the list generated in step 710 according to the processing requirements for the subtasks. The SP then selects the next task in the list in step 726, as previously described. Once all tasks in the list have been selected, the method ends in step 724. In the various embodiments, method 700 can be repeated for each frame being scheduled.

Although steps 712-732 describe one exemplary embodiment for assigning tasks to channels in the frame, in other embodiments of the present invention, tasks can be assigned sequentially on a channel-by-channel basis and still provide an increased utilization rating. In such an approach, a particular channel in the frame is first selected and then tasks are sequentially evaluated for assignment to the selected channel. Thus, a task is only assigned to the selected channel if the processing requirement for the task is the one in the task list in step 710 is most closely matching the remaining capacity in the channel. Thus each assignment also increases the total utilization.

This embodiment is illustrated with respect to FIG. 8. In these embodiments, the method 800 can proceed through steps 802-810, as previously described for steps 702-710 in FIG. 7. After the sorted list is generated in step 810, the method 800 can proceed to step 834. In step 834, the SP selects a first channel. The first channel can be selected in various ways. For example, the first channel can simply be any randomly selected channel in the frame. However, in order to increase utilization of a frame, the first channel selected can be the channel of the frame currently having the smallest amount of remaining capacity. Selecting the smallest channel allows the largest possible task to be used to first fill the selected channel. Regardless of how the first channel is selected in step 834, the SP subsequently selects in step 836 the largest unassigned task in the sorted list.

Once the first task is selected in step 836, the SP compares the available or remaining capacity of the selected channel to that of the selected task in step 838. If the SP determines in step 840 that the selected channel has sufficient capacity for the selected task, the SP assigns the task to the selected channel in step 842. If the SP determines that the selected channel has insufficient capacity in step 840, then the SP then determines whether a next task is available in the task list in step 844. If a next task exists, the SP selects the next task in step 846 and method 800 is repeated starting with step 838.

If no next task exists (i.e., the end of the sorted task list has been reached), then no other tasks can be added to the current channel and another channel needs to be selected. Accordingly, if the SP determines in step 844 that no next task exists, the SP determines whether a next channel is available in the current frame in step 848. If a next channel is available, a next channel is selected in step 850. The next channel can be selected from the remaining channels as previously described for step 834. The method 800 can then repeat for the newly selected channel starting with step 832. However, once no other channels are available for assigning tasks, the method 800 continues to step 852 and ends. In some embodiments, if a task cannot be assigned to any of the channels, the task can be added to tasks for a next frame or divided into subtasks, as previously described for steps 728-732 in FIG. 7. As previously described, the method described above can be repeated for each frame.

In some embodiments, sorting of the tasks can be skipped altogether, but as previously described, this lack of initial sorting can result in increased processing during the assignment process. However, even though increased computation is required, the result can still provide an increased utilization for the frame. Therefore, step 810 can be skipped in some embodiments. In these embodiments, rather than literally selecting the first and next tasks in the task list in steps 812 and 826, respectively, the first and next tasks are selected based on a search of the task list. That is, the SP searches in each of steps 812 and 826 for the task requiring the largest amount of capacity. Similarly, in FIG. 8, the task list can be searched in steps 836 and 846.

The illustrations of embodiments described herein are intended to provide a general understanding of the structure of various embodiments, and they are not intended to serve as a complete description of all the elements and features of apparatus and systems that might make use of the structures described herein. For example, rather than sorting tasks into an ordered list, tasks can be grouped into sorted size range bins, to decrease computation time. Accordingly, tasks become generally, if not perfectly sorted, by decreasing size. Although such an approach may not maximize total utilization or effective capacity for the channels, an improved utilization and effective capacity over FIFO methods is still provided. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

I claim:

1. A method for allocating available service capacity to a plurality of communication tasks in a communication system having a plurality of transmission channels within a frame, the method comprising:

receiving, in said communication system, a plurality of unassigned communication tasks, each requiring some portion of an available service capacity for transmission of data in said communication system;

first selecting, from among said plurality of unassigned communication tasks, a first communication task having a first requirement for available service capacity which is greater than the requirement for service capacity of a remainder of the plurality of unassigned communication tasks;

determining a plurality of transmission channels available within a frame in said communication system, each having an available service capacity;

identifying a subset of said plurality of transmission channels having an available service capacity greater than or equal to said first requirement;

second selecting, from the subset, a first transmission channel having an available service capacity that is less than the available service capacity of a remainder of the transmission channels in said subset;

assigning said first communication task to said first transmission channel.

2. The method according to claim 1, further comprising repeating said first selecting, determining, identifying, second selecting, and assigning steps until (1) each of said plurality of unassigned communication tasks has been assigned, or (2) each of said plurality of unassigned tasks has a service capacity requirement that is greater than the available service capacity of each of said plurality of transmission channels.

3. The method according to claim 2, wherein each transmission channel comprises a plurality of time slots, each of which can be allocated to exactly one communication task.

4. The method according to claim 2, further comprising assigning a second communication task to a subsequent frame in said communication system if the requirement for available service capacity of said second communication task exceeds said available service capacity in each of said plurality of transmission channels.

5. The method according to claim 1, further comprising:
dividing at least one of said plurality of unassigned communication tasks into a plurality of sub-tasks ; and
adding said plurality of sub-tasks to said plurality of unassigned communication tasks.

6. The method according to claim 1, further comprising:
sorting said plurality of unassigned communication tasks in accordance with said requirement for available service capacity of each task prior to said determining step.

7. The method according to claim 1, wherein said communication system is a time-division multiplex communications system.

8. The method according to claim 1, further comprising:
sorting a list of said plurality of transmission channels in accordance with an available service capacity of each transmission channel.

9. A system for data transmission, the system comprising:
a communication system having a plurality of transmission channels within a frame, each utilized in accordance with a time division multiplexing scheme;
a storage element configured for receiving a plurality of unassigned communication tasks to be allocated to an available service capacity of said system; and
a processing element configured for performing an allocation operation comprising:
(1) first selecting, from among said plurality of unassigned communication tasks, a first communication task having a first requirement for available service capacity which is greater than the requirement for service of a remainder of said plurality of unassigned communication tasks;

(2) identifying a subset of said plurality of transmission channels having an available service capacity within a frame that is greater than or equal to said first requirement;

(3) second selecting, from the subset, a first transmission channel having an available service capacity that is less than the available service capacity of a remainder of transmission channels in the subset; and (4) assigning said first communication task to said first transmission channel.

10. The system of claim 9, wherein said allocation operation further comprises repeating said first selecting, identifying, second selecting, and assigning operations for said plurality of unassigned communication tasks until (1) each of said plurality of unassigned communication tasks has been assigned or (2) each of said plurality of unassigned tasks has a service capacity requirement that is greater than the available service capacity of each of said communication channels.

11. The system of claim 10, wherein each said transmission channel is comprised of a plurality of time slots, each of which can be allocated to exactly one communication task.

12. The system of claim 11, wherein said allocation operation further comprises allocating a second task to a subsequent frame of said communication system if said requirement for available service capacity of said second task exceeds said available service capacity in each said processing channel.

13. The system of claim 12, wherein said allocation operation further comprises:
dividing at least one of said plurality of unassigned communication tasks into a plurality of sub-tasks ; and
adding said plurality of sub-tasks to said plurality of unassigned communication tasks.

14. The system claim 9, wherein said allocation operation further comprises sorting said plurality of unassigned communication tasks in accordance with said requirement for available service capacity of each task prior to said determining step.

15. The system of claim 9, wherein said communication system is a time-division multiplex communications system.

16. The system of claim 9, wherein said allocation operation further comprises sorting a list of said plurality of transmission channels in accordance with an available service capacity of each.

17. A non-transitory computer readable storage medium, having stored thereon a computer program for allocating available transmission capacity to a plurality of data transmission tasks in a time-division multiplex communications system (TDM system) having a plurality of transmission channels utilized in accordance with a time division multiplex processing scheme, the computer program having a plurality of code sections, the code sections executable by a computer to cause the computer to perform the steps of:
receiving a plurality of unassigned data transmission tasks to be allocated to said available transmission capacity;
first selecting a task from among said plurality of unassigned data transmission tasks having a requirement for available transmission capacity which is greater than the requirement for service capacity of a remainder of the plurality of unassigned communication tasks;
determining a plurality of transmission channels available within a frame in said communication system, each having an available service capacity;
identifying a subset of said plurality of transmission channels having an available transmission capacity greater than or equal to said first requirement;
second selecting, from the subset, a first transmission channel having an available service capacity that is less than the available service capacity of a remainder of the transmission channels in the subset; and
assigning said first task to said first transmission channel.

18. A non-transitory computer readable storage medium of claim 17, further comprising code sections for repeating said first selecting, determining, identifying, second selecting, and assigning steps until (1) each of said plurality of unassigned communication tasks has been assigned, or (2) each of said plurality of unassigned tasks has a service capacity requirement that is greater than the available service capacity of each of said communication channels.

19. A non-transitory computer readable storage medium of claim 18, wherein each of said plurality of transmission channels is comprised of a plurality of time slots, each of which can be allocated to exactly one communication task.

20. A non-transitory computer readable storage medium of claim 17, further comprising code sections for sorting said plurality of unassigned data transmission tasks in accordance with said requirement for available service capacity of each task prior to said determining step.

* * * * *